United States Patent [19]
Harron

[11] 3,963,257
[45] June 15, 1976

[54] ROLL HANDLING

[75] Inventor: Robert E. Harron, Woburn, Mass.

[73] Assignee: Brodie, Inc., Woburn, Mass.

[22] Filed: Mar. 31, 1975

[21] Appl. No.: 563,739

[52] U.S. Cl. ............................. 280/43.12; 280/46; 280/79.1
[51] Int. Cl.² ........................................ B62D 21/18
[58] Field of Search ............ 280/43.12, 46, 150 A, 280/79.1

[56] References Cited
UNITED STATES PATENTS

| | | |
|---|---|---|
| 2,178,647 | 11/1939 | Raymond ...................... 280/43.12 |
| 2,687,310 | 8/1954 | Goetz ............................... 280/46 |
| 3,143,358 | 8/1964 | Broff ............................ 280/43.12 |
| 3,525,501 | 8/1970 | Goetz ........................... 280/43.12 |

*Primary Examiner*—Robert R. Song
*Attorney, Agent, or Firm*—Charles Hieken; Jerry Cohen

[57] ABSTRACT

Elongated loads, such as rolls of materials, conveyor rollers or drums are movable by a five-wheel carrier apparatus comprising an elongated frame with rear wheels for carrying the load and a tow dolly which comprises a single front wheel and a pair of swivelling rear wheels which seat under the front end of the carrier frame.

10 Claims, 4 Drawing Figures

ROLL HANDLING

BACKGROUND OF THE INVENTION

The present invention relates in general to handling elongated heavy loads on shop floors and in warehouses and more particularly concerns handling such elongated loads as 5-to-15-foot-long drums, rollers, rolls of material and the like. Compact apparatus according to the invention handles these loads while turning about very small radii. The apparatus is relatively inexpensive and easy to make, is rugged and facilitates handling these loads.

According to a typical prior art approach, a tow dolly pulls an elongated carrier frame with rear wheels and a front trailer hitch connection (to a tow dolly) mounted on a high transverse beam at the front end of the carrier frame. The hitch typically comprises a downwardly extending stub shaft at the forward center of the trailer frame. The tow dolly is a self propelled vehicle with three or four wheels and a rear lift for lifting its hitch connection into engagement with the carrier frame hitch and raising the front end of the carrier frame off the ground for moving a load.

It is an important object of the present invention to reduce the overall geometric envelope of apparatus of the class described.

It is a further object of the invention to reduce turning radii for movement of elongated loads consistent with the preceding object.

It is a further object of the invention to provide economic apparatus consistent with one or both of the preceding objects.

It is a further object of the invention to achieve one or more of the preceding objects while efficiently utilizing the apparatus when both carrying and not carrying a load.

It is a further object of the invention to provide ease of interchangeability of apparatus parts consistent with one or more of the preceding objects.

SUMMARY OF THE INVENTION

According to the invention, carrier apparatus for elongated loads comprises means defining an elongated carrier frame and a tow dolly with intermediate swivelled wheels.

The carrier frame has front and rear load carrying members, rear wheels and a forward transverse beam. The carrier frame preferably comprises a pair of bearings mounted at front and rear ends of the frame for carrying axle ends of the elongated load, e.g. a central spool rod in a roll of material or a central axle shaft of a drum-type roller.

The tow dolly has a front drive wheel and trailing rear wheel sets. The trailing rear wheel sets are mounted from at least one rearward extension of the tow dolly which is raisable to engage and lift the forward transverse beam of the elongated frame carrier. The liftable extension and rear wheel sets are mounted very close to the tow dolly body and the front wheel thereof, being preferably no further back than necesary to get under and lift the front end of the elongated frame carrier.

The rear wheel sets comprise alternatively engageable main and auxiliary rear wheels with axles. The main wheel axle is rigidly interconnected to the rear extension(s), and the auxiliary wheel axles are interconnected to the rear extension(s) via a swivel mounting, such as a caster, which allows the auxiliary wheels to pivot about an axis essentially normal to the auxiliary wheel axles.

A mounting, preferably pivotable, for alternatively engaging the main and auxiliary rear wheels with the ground is integrated with the extension(s) lifting drive so that lifting of the transverse beam to lift the front end of the load and engagement of the auxiliary wheels is essentially simultaneous and so that dropping the front end of the frame carrier and engagement of the main rear wheels is essentially simultaneous.

These and other objects, features and advantages of the invention will be apparent from the following detailed description with reference to the accompany drawing in which:

DETAILED DESCRIPTION OF PREFERRED EMBODIMENTS

Figure 1:
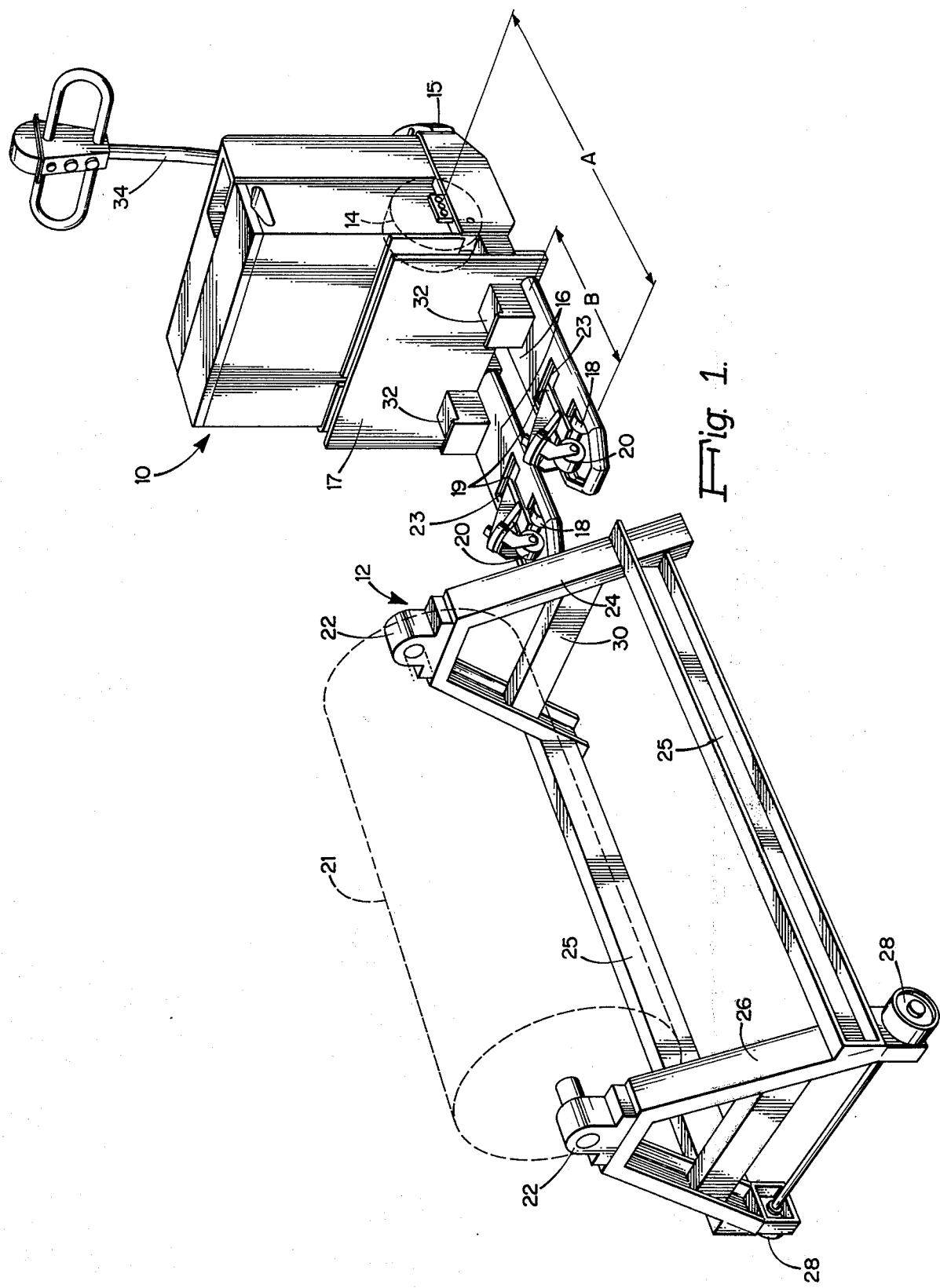
FIG. 1 is an isometric view of carrier apparatus in accordance with a preferred embodiment of the invention with the carrier frame and tow dolly portions of the apparatus being separated for convenience of illustration.

Referring now to FIG. 1 of the drawing, there is shown a two part elongated article handling apparatus comprising a tow dolly 10 and an elongated article carrier 12. The tow dolly comprises a forward wheel 14 mounted on a forward body section 15 and a pair of rearwardly extending forks 16 mounted on an elevatable rear section 17. In each of the forks main rear wheels 18 and auxiliary rear wheels 20 are mounted to the forks via a common arm 19 with a pivotal mounting 23.

The carrier comprises spaced bearings 22 mounted on a forward A-frame 24 and rear A-frame 26 tied together with elongated beams 25. The forward transverse beam is high enough to allow passage thereunder of the dolly's rear structural elements, 16, 18, 19, 20. The elongated article 21, shown in outline, may have a central shaft supported in bearings 22.

Rear wheels 28 are mounted on frame 26 and a box beam 30 is mounted on frame 24 and extends transversely to the direction of elongation of carrier 12. Rigid supporting members 32 are mounted on forks 16 forwardly of their rear wheels 18, 20. A tow handle 33 may be provided on body 15 of the dolly for maneuvering the front wheel 14.

In order to move carrier 12 around, dolly 10 riding on front wheel 14 and main rear wheels 18 backs until its forks 16 run under and past beam 30, aligning supports 32 with beam 30. Then frame portion 17 and forks 16 are elevated so that supports 32 engage beam 30 to lift the front end of carrier 12 off the ground simultaneously with auxiliary rear wheels 20 pivoting about axis 19 to come into ground engagement while main rear wheels 18 rise off the ground. The assembled apparatus is then movable on wheels 14, 20 and 28 and steerable by handle 34.

The overall spacing A from front wheel 14 to auxiliary rear wheels 20 (when lowered) is less than half the length of the carrier 12, and the distance B from supports 32 to wheels 20 is preferably less than one-fourth the carrier length. Carrier length, for purposes of the above ratios, is defined as the length from beam 30 to rear wheels 28. Such close spacing together with the caster mounting of wheels 20 provides a tight turning radius for the assembled apparatus and enables turning without dragging wheels 20.

The dolly 10 requires less space for movement than conventional fork lift apparatus.

Figure 2:
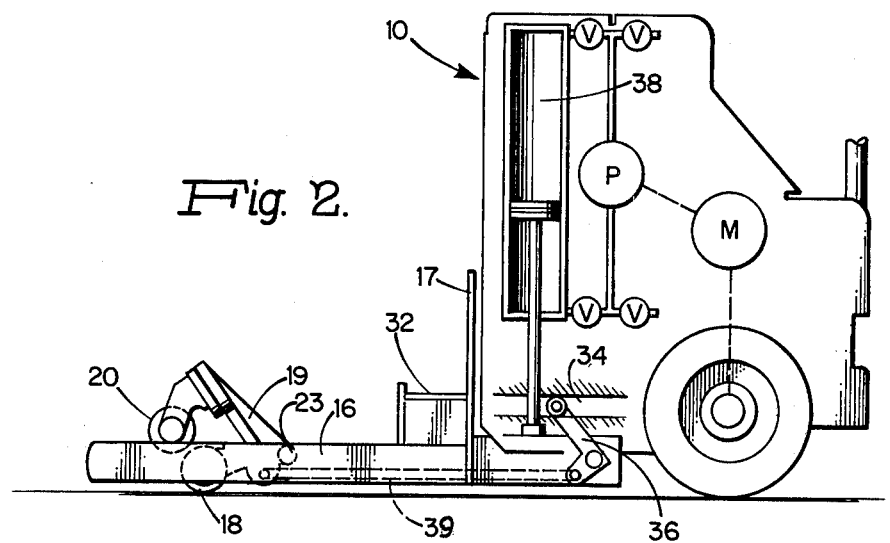
FIGS. 2 and 3 are cross-sectional views with schematic portions, through one of the fork rear extensions of the tow dolly of FIG. 1 in two operating positions showing the operative linkage for alternative engagement of the main and rear wheels of the rear wheel set mounted from the fork in synchronism with fork lifting.
Figure 3:
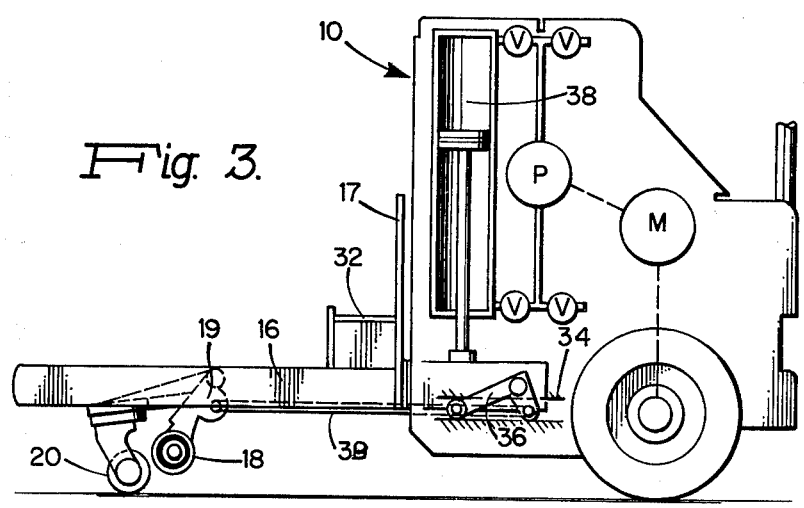

Referring now to FIGS. 2 and 3, there are shown axial sectional views through an assembled dolly 10 and carrier 12 cut through one of the forks 16, helpful in understanding the mode of operation when lifting and lowering. In each fork, a main rear wheel 18 and auxiliary rear wheel 20 are mounted from pivot 23 on a common pivot arm 19. A fixed rail 34 guides one end of a bellcrank link 36 which is mounted on fork 16. The forks are drivable up or down by hydraulic cylinder 38, and such displacement rotates the bellcrank link. The other end of bellcrank link 36 is connected to pivot arm 19 via a link 39. The same motor in which normally drives the forward wheel of dolly 10 may be used to drive a pump P for feeding pressurized fluid to and draining fluid from cylinder 38 via valves V.

Initially (FIG. 2), wheels 18 are in ground engagement. A portion of each arm 19 bears against each fork 16 to keep wheels 18 from bouncing up. Then hydraulic cylinder 38 is energized to raise forks 16 and section 17 and turn bellcranks 36 to pull links 39 forward. Supports 32 engage beam 30 of the carrier, (FIG. 1). As forks 16 rise, the wheels 18 and 20 on arms 19 pivot to the positions shown in FIG. 3 with auxiliary rear wheels 20 in forwardly toed-in ground engagement and rear wheels 18 off the ground.

Figure 4:
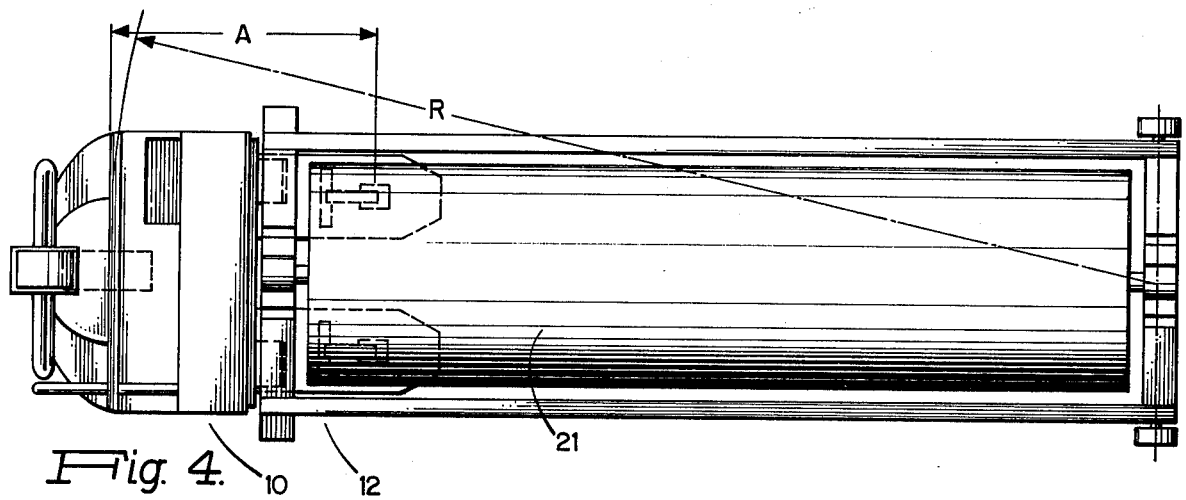
FIG. 4 is a top view of the FIG. 1 apparatus fully assembled indicating its turning capabilities.

FIG. 4 shows a top view of the FIG. 3 structure and indicates specification dimensions, including turning radius R and the above described dimensions A and B.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Carrier apparatus for elongated loads comprising,
    means defining an elongated frame comprising front and rear load carrying members, rear wheels, and a transverse beam at a forward end of said frame,
    means defining a tow dolly for towing said frame with a forward drive wheel and at least one rearward extension for engaging and supporting said forward transverse beam,
    means defining at least one set of main and auxiliary wheels for said dolly,
    means mounting said main wheels and auxiliary wheels from said extension for alternating ground contact,
    and means for swivelling said auxiliary wheels.

2. Carrier apparatus for elongated loads in accordance with claim 1 and further comprising,
    means for raising and lowering said extension to raise and lower the forward end of said frame.

3. Carrier apparatus in accordance with claim 2 wherein said extension comprises two forks and two transversely spaced sets of rear wheels, each set comprising one of said main and auxiliary wheels, are provided, one of said sets being mounted on each fork.

4. Carrier apparatus in accordance with claim 2 wherein the main and auxiliary wheels of each set are mounted on a common lever member having a pivotal support on the fork.

5. Carrier apparatus in accordance with claim 4 wherein the auxiliary rear wheel and main rear wheel are arranged on said lever member and so linked to the fork that raising the fork places the auxiliary wheel in ground engagement and so that lowering the fork places the main wheel in ground engagement while raising the auxiliary wheel.

6. Carrier apparatus in accordance with claim 5 wherein the linkage of said pivotal arm to the fork comprises a bellcrank link mounted at a central pivot point thereof on said fork with one bellcrank end connected to said pivotal arm and further comprising,
    means defining a fixed track for restraining movement of the other end of the bellcrank link to an essentially horizontal path.

7. Carrier apparatus in accordance with claim 1 and further comprising,
    means defining a raised support on said rear extension forward of said rear wheel set thereon.

8. Carrier apparatus in accordance with claim 1 wherein the spacing between the front wheel and auxiliary rear wheels of said tow dolly is less than half the frame length.

9. Tow dolly comprising,
    means defining a forward body and a pair of parallel, elevatable rear extension forks,
    means defining a forward drive wheel mounted on said forward body,
    means defining a transverse pivotal mount on each of said forks,
    means defining a main rear wheel and swivelable auxiliary rear wheel pivotably mounted from the transverse pivotal mount of each fork and arranged so that raising said fork engages the auxiliary wheel with the ground and lowering the fork engages said main wheel,
    and means for raising and lowering said forks,
    the length from forward to auxiliary rear wheels, when lowered, being no greater than 3 feet.

10. Tow dolly in accordance with claim 9 and further comprising,
    means defining a raised support surface on each fork forward of the transverse pivotal mount thereof.

* * * * *